United States Patent [19]

Hoffman, Jr.

[11] 3,879,648

[45] Apr. 22, 1975

[54] CAPACITIVE BASED VOLTAGE REDUCER AND REGULATOR

[75] Inventor: Harry S. Hoffman, Jr., Saugerties, N.Y.

[73] Assignee: International Business Machines Corporation, Armonk, N.Y.

[22] Filed: Dec. 17, 1973

[21] Appl. No.: 425,387

[52] U.S. Cl. .......................... 321/2; 320/1; 321/18; 323/25
[51] Int. Cl. ......................................... H02p 13/32
[58] Field of Search ............... 321/2, 15, 18; 320/1; 307/109, 110, 150; 323/25, 43.5 S

[56] References Cited
UNITED STATES PATENTS

| | | | |
|---|---|---|---|
| 3,310,727 | 3/1967 | Flannery | 321/2 |
| 3,355,653 | 11/1967 | Paradissis | 321/18 |
| 3,551,789 | 12/1970 | Baker et al. | 323/43.5 S |
| 3,602,795 | 8/1971 | Gunn | 321/15 |

OTHER PUBLICATIONS

IBM Technical Disclosure Bulletin, Mattson, "Regulated Power Supply," Vol. 13, No. 7, pp. 1850, 1851 Dec. 1970.

*Primary Examiner*—William H. Beha, Jr.
*Attorney, Agent, or Firm*—Douglas R. McKechnie

[57] ABSTRACT

A combined voltage reducer and regulator is provided for delivering a relatively low voltage, derived from a higher voltage source, to a load so as to maintain a relatively constant voltage at the load. The voltage reducer comprises a plurality of capacitors, diodes and selectively operated switches which, dependent upon the order of application of timing signals, operates in either one of two different modes to achieve different degrees of voltage reduction. The inherent nature of the capacitors provide a limited degree of voltage regulation. Supplementing this, in each mode of operation, a voltage regulator or regulating circuit is provided to provide a fine degree of voltage regulation between limits. When one limit is reached, the mode of operation of the voltage reducer is switched to allow the fine degree of regulation to take place in the other mode, the switching between modes providing a coarser degree of voltage regulation.

8 Claims, 2 Drawing Figures

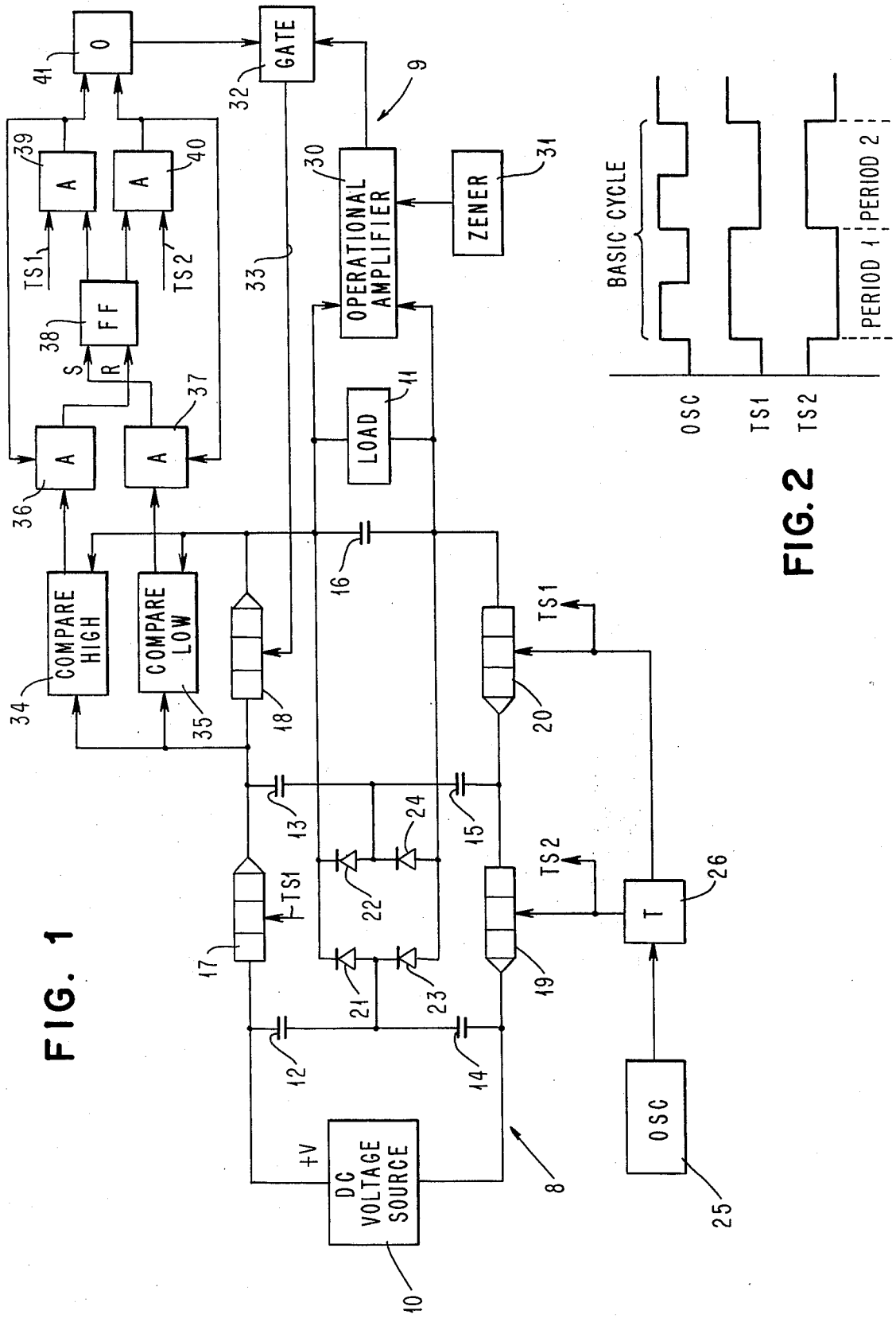

CAPACITIVE BASED VOLTAGE REDUCER AND REGULATOR

RELATED PATENT APPLICATION

Filed concurrently herewith is a related invention "Capacitive Voltage Reducer", by H. S. Hoffman, Jr., Ser. No. 425,386, filing date Dec. 17, 1973, and assigned to the assignee of the present application. The related application is directed to novel voltage reducers which may be used in the present invention.

BACKGROUND OF THE INVENTION

Field of the Invention

This invention relates to electrical voltage reducers and regulators of the type in which a plurality of capacitors are used to achieve the voltage reduction.

SUMMARY OF THE INVENTION

Currently, in the field of data processing, electronic digital computers contain many thousands of circuits. The systems include power supplies that for efficiency provide a relatively high voltage which must be reduced and distributed to various circuits and networks within the system. While many circuits or loads operate at a relatively constant impedance, the problem of voltage reduction is relatively simple. However, where there is a variable input voltage or variable load impedance, the problem of voltage reduction is more complex and a degree of voltage regulation is necessary. Moreover, since modern computers are currently being implemented in LSI (large scale integration) technologies, it is also desirable that the voltage reduction and regulation network be susceptible to implementation in such technology. Accordingly, it is the principal object of the invention to provide a combined voltage reducer and regulator subject to being implemented in LSI technologies of the type particularly suitable for use in electronic digital data processing machines.

Another object is to provide a voltage reducer and regulator composed principally of transistors, capacitors, and diodes in which the voltage ratings of the transistors and diodes are minimized.

A further object is to provide a voltage reducer that is operable in at least two different modes to achieve two different degrees of voltage reduction.

A further object is to provide a voltage regulator that provides both coarse and fine degrees of voltage regulation where the coarse degrees are obtained by switching the voltage reducer between a plurality of different modes providing different degrees of voltage reduction.

Briefly, the preferred embodiment of the invention comprises a capacitive based voltage reducer operable in at least two different modes to achieve at least two different degrees of voltage reduction. The reducer includes at least one capacitor that, in one mode, is used to reduce the voltage applied to the load and, in another mode, is effectively bypassed. A voltage regulator is used to provide a fine degree of voltage regulation across the load. A coarse degree of voltage regulation is effected by switching the operation of the voltage reducer between modes.

DESCRIPTION OF THE DRAWING

The foregoing and other objects, features and advantages of the invention will be apparent from the following more particular description of a preferred embodiment of the invention, as illustrated in the accompanying drawing.

FIG. 1 is a combined circuit and logic diagram showing a combined voltage reducer and regulator embodying the invention;

FIG. 2 is a timing diagram of timing signals used in the embodiment of FIG. 1.

DETAILED DESCRIPTION

Referring now to the drawing, there is shown a combined voltage reducer 8 and regulator 9 for receiving power from a DC voltage source 10 at a relatively constant and high voltage V and supplying electrical energy to a load 11 at a reduced voltage. Reducer 8 comprises a plurality of capacitors 12–16, a plurality of transistors 17–20, and a plurality of diodes connected as shown in FIG. 1. Transistors 17, 19 and 20 are driven so as to be operated as switches and will be referred to hereafter simply as switches that, dependent upon actuation thereof by pulsed timing signals, are either on or off, i.e., conductive or non-conductive. Transistor 18 for purposes of voltage regulation, is operated as a switched proportional amplifier during periods of its operation, in a manner described more fully below.

An oscillator 25 provides a basic timing signal that is fed to a binary trigger 26 to produce two timing signals TS1 and TS2 which provide a basic cycle of two periods as shown in FIG. 2. When one is active the other is inactive. These timing signals are fed to the bases of transistor 17, 19 and 20 to cause them, when the signals are active, to be switched on. The timing signals also control the periods of operation of transistor 18 whereby voltage reducer 8 is operable in either one of two modes, described below, providing different degrees of voltage reduction. Voltage reducer 8 operates similar to the second embodiment disclosed in the aforementioned related application.

The capacitive values of capacitors 12–15 are preferably chosen so as to have time constants that are relatively long compared to the time duration of the basic period of operation of the timing signals. As will be more apparent below, these capacitors are operated so as to be repetitively charged and discharged so as to fluctuate around nominal values. Because of the relatively short period of charging and discharging due to the long time constant, only a relatively small charge is transferred during a given period. To insure correct operation, it is necessary that the switches that are active or on in one period be turned completely off before any are turned on during the next period. Thus a series of glitches might appear on the input current going towards the load. In order to smooth out these glitches, output capacitor 16 is connected in parallel with load 11 and its value may be different from that of the other capacitors in order to minimize its required rating and provide the smoothing action on the current flow.

In order to more readily understand the invention, assume for the moment that transistor 18 acts as a switch, similar to the other transistors and is either on or off dependent upon the period and which mode the reducer is operating in. The first mode of operation of reducer 8 is defined by applying the timing signals TS1 to switches 17 and 20 to switch them on during one period while the other two switches are off, and then reversing so that during the next period, signal TS2 is active and switches 18 and 19 are on while the others are off. With such a mode of operation, voltage reducer 8 is effective to reduce the source voltage V to ¼ V at the load. It is to be appreciated that in a practical application, such voltages are nominal and do not take into account the small losses that would be normally encountered. During the first period of the first mode when switches 17 and 20 are switched on, the following action occurs assuming the convention, used hereinafter, that current flows from positive to negative potentials. Current flows from both source 10 and capacitor 12 through switch 17, capacitor 13, diode 22, the parallel combination of capacitor 16 and load 11, and diode 23. Then the current splits and some flows back to the other plate of capacitor 12 and some flows through capacitor 14 back to source 10. In other words, capacitors 13 and 14 are connected in series with load 11 and are charged with energy from source 11 and capacitor 12, the latter discharging during period 1. Concurrently, when switch 20 is switched on, capacitor 15, in parallel with load 11 and capacitor 16, discharges to also supply energy to the load and to capacitor 16. The current path for this circuit extends from the upper plate of capacitor 15, and through diode 22, load 11 and capacitor 16, and switch 20 to the bottom plate of capacitor 15.

During the second period of the first mode, switches 18 and 19 are on and an action similar to that described with reference to the operation during period one occurs except that it is reversed. With switch 18 on, current flows from the upper plate of capacitor 13 and through switch 18, load 11 and capacitor 16, and diode 24 back to the bottom plate of capacitor 13. Concurrently, current flows from source 10 and through capacitor 12 and combines with current from the discharge capacitor 14. The combined current then flows through diode 21, capacitor 16 and load 11, diode 24, capacitor 15 and switch 19. The current then splits for return to the bottom plate of capacitor 14 and to source 10. At the start of operation, if all of the capacitors are fully discharged, the capacitors would gradually be charged until they reach an equilibrium condition or nominal voltage about which they are charged and discharged in the manner described above. In this first mode of operation, the nominal voltage drops across the respective capacitors are: capacitor $12 = ½$ V, capacitor $13 = ¼$ V, capacitor $14 = ½$ V, capacitor $15 = ¼$ V and capacitor $16 = ¼$ V.

In the second mode of operation, switch 18 is operated along with switches 17 and 20 during the first period, and only switch 19 is turned on during the second period. This then provides a nominal voltage reduction of ⅓ V. In this second mode of operation, the nominal voltage drops across the capacitors are as follows: capacitor $12 = ⅓$ V, capacitor 13 immaterial, capacitor $14 = ⅔$ V, capacitors 15 and $16 = ⅓$ V. During the first period of the second mode, capacitors 12 and 15 discharge while capacitor 14 charges. During the first period, current flows from source 10 and capacitor 12, through switches 17 and 18, load 11 and capacitor 16, and diode 23. The current then splits and some flows back to capacitor 12 and some through capacitor 14 to source 10. Concurrently, capacitor 15 discharges as before. Capacitor 13 is effectively bypassed and is immaterial. During the second period where TS2 is the active signal, only switch 19 is on and this causes the discharge of capacitor 14 and charging of capacitors 12 and 15 similar to the operation in the first mode.

It is to be appreciated that in either of these two modes of operation, there is a degree of voltage regulation inherent from the capacitive based voltage reducing circuit which regulation is effective against variations in the load impedance. Thus, if the voltage across load 11 changes, the equilibrium of the capacitors change in a direction tending to offset the load changes. To provide a greater degree of voltage regulation including regulating against changes in the input voltage V, an operational amplifier 30 is connected across the load to sense the voltage drop across and compare such drop with a standard or reference voltage from a zener diode 31. The result is to provide, in a standard or conventional fashion, an output signal from amplifier 30 that will be fed through gate 32, when it is activated, along line 33 to the base of transistor 18 to thereby control its operation. Gate 32 is activated during either the first or second period dependent upon which mode reducer 8 is operating in. Such means provides a fine degree of voltage regulation for each mode of operation.

Means are provided to switch reducer 8 between the different modes of operation to achieve a coarser degree of regulation. Comparators 34 and 35 are connected across transistor 18 for sensing the voltage drop there across and comparing it to predetermined high and low values that correspond to the points at which the operation of transistor 18 becomes saturated and dissipation limited. Comparators 34 and 35 provide output signals that are fed as inputs to AND circuits 36 and 37 which in turn provide outputs for operating the reset and set respectively lines of a flip-flop 38. The outputs of flip-flop 38 are oppositely phased and are fed to AND circuits 39 and 40 which also receive timing signals input TS1 and TS2. The output of AND circuits 39 and 40 are fed as inputs to OR circuit 41 for controlling the activation of gate 32 and are also fed back as inputs to AND circuits 37 and 36.

The operation of combined voltage reduction and regulation functions will now be described. Within a given mode of operation of reducer 8, operational amplifier 30 is able to provide a range of linear operation of transistor 18 for controlling the current so as to offset variations in the voltage across load 11 either due to changes in the input voltage V or in the impedance of load 11. This range of regulation would extend over the active area for operation of transistor 18 between excessive dissipation and saturation. The range of regulation is sensed by means of comparators 34 and 35. Comparator 34 compares the voltage drop across transistor 18 with a predetermined value corresponding to the limit of the range of operation when the transistor is about to over dissipate and thus as the range of regulation approaches excessive dissipation the compare high circuit 34 produces an output signal for actuating AND circuit 36. Similarly, as the range of operation approaches saturation, the compare low circuit 35 would produce an output signal for AND circuit 37. The voltage to be regulated would be established in zener diode 31. Let us assume that reducer 8 is operating within the first mode of voltage regulation and, in this mode, transistor 18 would be operated during period 2 to provide a range of linear operation. As the voltage drop across load 11 varies and the operation of transistor 18 approaches saturation, the compare low circuit 35 produces an active output signal that is fed to AND circuit 37. In order for reducer 8 to be in the first mode, flip-flop 38 is in a normally reset condition in which case its active output from the lower right hand corner of flip-flop 38 is fed to AND circuit 40 so that in conjunction with timing signal TS2, the first mode of operation is achieved. The output of AND circuit 40 that is fed back to AND circuit 37 enables AND circuit 37 during time TS2 so that when the compare low signal is generated, AND circuit 37 produces an output signal that sets flip-flop 38. This then causes an active signal to be fed to AND circuit 39 which, in conjunction with timing signal TS1, causes reducer 8 to operate in the second mode of operation. The output of AND circuit 39 is fed as an input to AND circuit 36 so that when the degree of regulation within this mode approaches the over dissipation value of the transistor, the compare high circuit will generate an output signal that is fed to AND circuit 36 so as to, during time TS1, reset flip-flop 38 and thereby switch the operation of reducer 8 from the second mode to the first mode.

It should be apparent that the total range of regulation is limited by the outer limits of the two modes and that this could be extended by arranging reducer 8 to provide more modes or degrees of voltage reduction. To further illustrate the invention, assume that it is designed for the case of a maximum input voltage which, when operating in the first mode, will produce a full voltage drop across transistor 18. As the input voltage falls, the drop across 18 decreases until the fact that its operation is just short of saturation is detected by comparator 35. This causes a mode switch to take place, as described above, that provides more voltage and hence a greater drop across transistor 18. As the input voltage further decreases, transistor 18 will approach saturation and thereby establish the lower limit for falling input voltages. Now consider what happens as the input voltage thereafter increases. The drop across 18 increases until the compare high circuit 34 detects the condition and causes a switch to the first mode. This then reduces the drop across 18 and the input voltage can increase until the higher limit is reached.

It should be obvious to those skilled in the art that the invention is not limited to the specific logic disclosed nor to the details of the voltage reducer inasmuch as other forms of control and voltage reduction can be used. For example, the first embodiment disclosed in the related application could also be switched between modes having different degrees of voltage reduction, as described therein. It should be apparent that other changes or variations can be made without departing from the scope of the invention.

What is claimed is:

1. In an electrical circuit in which power from a voltage source at a relatively high voltage is supplied to a load at a reduced voltage, the combination comprising:

voltage reducing means connected between said source and said load for supplying power from said source to said load, said voltage reducing means being operable in two modes each providing a different degree of voltage reduction, said voltage reducing means comprising a selectively controllable transistor providing a variable voltage drop;

voltage regulating means responsive to the voltage drop across the load for controlling said transistor in accordance therewith to provide a dynamic proportional range of voltage regulation when said voltage reducing means is operating in each of said modes;

and control means responsive to the voltage drop across said transistor for switching said voltage reducing means between said modes when predetermined limits of voltage drop across said transistor are reached.

2. The combination of claim 1 wherein:

said range is defined by the voltage drop across said transistor, one of said predetermined limits being a first voltage drop indicating said transistor is close to saturation, another of said limits being a second voltage drop indicating said transistor is close to overdissipation.

3. The combination of claim 2 wherein:

said control means includes means sensing said first and second voltage drops, said control means being operative, when said voltage reducing means is operating in the one of said modes providing the greatest degree of voltage reduction, to switch to the other mode in response to sensing said first voltage drop and to thereafter switch from said other mode to said one mode in response to sensing said second voltage drop.

4. In an electrical circuit for supplying power to a load at a relatively low and constant voltage, said power being obtained from a source supplying power at a relatively high voltage, the combination comprising:

first and second semi-conductive switching devices connected in series with each other and with said load, each of said devices being selectively actuatable to an "on" state in response to pulsed signals;

5. The combination of claim 4 comprising:

voltage regulating means responsive to the voltage drop across said load for controlling the degree of charging and discharging of said second capacitor so as to offset any changes in the voltage drop across said load and thereby regulate such voltage.

6. The combination of claim 4 comprising:

control means operable to control said selectively controllable means for controlling switching between said modes of operation.

7. The combination of claim 6 comprising:

one of said switching devices being a transistor rendered conductive by the applications thereto of said pulsed signals;

and voltage detection means responsive to the voltage drop across said load for varying said pulsed signals to control the degree of conduction of said transistor so as to maintain a relatively constant voltage drop across said load.

8. The combination of claim 7 comprising:

said control means including means responsive to the voltage drop across said transistor for controlling the switching between said modes in accordance with reaching predetermined values of such voltage drop.

* * * * *

PO-1050
(5/69)

UNITED STATES PATENT OFFICE
CERTIFICATE OF CORRECTION

Patent No. 3,879,648          Dated April 22, 1975

Inventor(s) Harry S. Hoffman, Jr.

It is certified that error appears in the above-identified patent and that said Letters Patent are hereby corrected as shown below:

In column 6, Claim 4, between lines 38 and 39 insert the following:

a pair of diodes connected in series with each other and said load;

first and second capacitors;

means connecting said first capacitor between the common points between said devices and said diodes;

first circuit means connected in series with said devices and said load and providing a source of power thereto;

a source of pulsed signals for controlling the switching of said devices;

selectively controllable means for applying said pulsed signals to said devices in two different modes, one mode being operative to repetitively alternately switch said devices "on", the other mode being operative to repetitively concurrently switch said devices "on", to provide two different degrees of voltage reduction;

and second circuit means connected to said second capacitor and operative to periodically charge said second capacitor;

said second circuit means connecting said second capacitor to one of said switching devices for discharging said second capacitor when such device is "on", such discharging being effective to supply power to only said load during said other mode and to both said load and said first capacitor during said one mode.

Signed and Sealed this

Fourteenth Day of December 1976

[SEAL]

Attest:

RUTH C. MASON
*Attesting Officer*

C. MARSHALL DANN
*Commissioner of Patents and Trademarks*